US009953348B2

United States Patent
Whelan

(10) Patent No.: US 9,953,348 B2
(45) Date of Patent: *Apr. 24, 2018

(54) SYSTEM AND METHOD FOR CLIENT-SIDE ADVERTISEMENT RETRIEVAL

(71) Applicant: Disney Enterprises, Inc., Burbank, CA (US)

(72) Inventor: Jarrod David Whelan, Seattle, WA (US)

(73) Assignee: Disney Enterprises, Inc., Burbank, CA (US)

( * ) Notice: Subject to any disclaimer, the term of this patent is extended or adjusted under 35 U.S.C. 154(b) by 687 days.

This patent is subject to a terminal disclaimer.

(21) Appl. No.: 14/091,020

(22) Filed: Nov. 26, 2013

(65) Prior Publication Data

US 2015/0149304 A1 May 28, 2015
US 2018/0047066 A9 Feb. 15, 2018

(51) Int. Cl.
*G06Q 30/00* (2012.01)
*G06Q 30/02* (2012.01)

(52) U.S. Cl.
CPC .............................. *G06Q 30/0277* (2013.01)

(58) Field of Classification Search
CPC .............. G06Q 30/02; G06Q 30/0241; G06Q 30/0273; G06Q 30/0277; G06Q 30/0276; G06Q 30/0257
See application file for complete search history.

(56) References Cited

U.S. PATENT DOCUMENTS

| 5,999,912 A * | 12/1999 | Wodarz ................. G06Q 30/02 705/14.61 |
| 6,049,773 A * | 4/2000 | McCormack .......... G06Q 40/08 705/4 |
| 6,871,191 B1 * | 3/2005 | Kinney, Jr. ............ G06Q 40/04 705/37 |
| 6,882,348 B2 * | 4/2005 | Hirono .............. G06F 17/30241 345/619 |
| 6,941,562 B2 * | 9/2005 | Gao ........................ G06F 9/547 709/203 |

(Continued)

FOREIGN PATENT DOCUMENTS

| DE | 2772 881 | * | 2/2014 | ............. G06Q 30/02 |
| EP | 2772881 A1 | * | 9/2014 | |

(Continued)

OTHER PUBLICATIONS

Kae et al.: Categorization of Display Ads using Image and Landing Page Features, 2011, ACM, pp. 1-8.*

(Continued)

*Primary Examiner* — Bijendra K Shrestha
(74) *Attorney, Agent, or Firm* — Patterson + Sheridan, LLP

(57) ABSTRACT

Techniques are described for retrieving advertisements for insertion into a document. Embodiments receive a document comprising a request to retrieve a plurality of advertisement creatives. In response to transmitting the request specified within the received document to the advertisement management system, a single software object defining all of the plurality of advertisement creatives is received. Embodiments insert each of the plurality of advertisement creatives into the document, prior to rendering the document, and then render the document together with the advertisement creatives.

11 Claims, 3 Drawing Sheets

(56) References Cited

U.S. PATENT DOCUMENTS

| | | | |
|---|---|---|---|
| 7,454,434 B1* | 11/2008 | Cohen, Jr. | G06F 17/30902 |
| 7,734,624 B2 | 6/2010 | Anderson et al. | |
| 7,734,724 B2 | 6/2010 | Rezvani et al. | |
| 7,761,900 B2* | 7/2010 | Crayford | H04N 7/17318 |
| | | | 709/223 |
| 2003/0163372 A1* | 8/2003 | Kolsy | G06F 17/3089 |
| | | | 705/14.49 |
| 2007/0265923 A1* | 11/2007 | Krassner | G06Q 30/02 |
| | | | 705/14.51 |
| 2008/0306824 A1* | 12/2008 | Parkinson | G06Q 30/02 |
| | | | 705/14.73 |
| 2009/0048920 A1* | 2/2009 | Lodhiya | G06Q 30/0264 |
| | | | 705/14.61 |
| 2009/0049373 A1* | 2/2009 | Sharma | H04L 67/02 |
| | | | 715/234 |
| 2009/0063262 A1* | 3/2009 | Mason | G06Q 30/0256 |
| | | | 705/14.54 |
| 2009/0089830 A1* | 4/2009 | Chandratillake | G06Q 30/02 |
| | | | 725/32 |
| 2009/0171790 A1* | 7/2009 | Nagarajayya | G06Q 30/02 |
| | | | 705/14.61 |
| 2009/0271690 A1* | 10/2009 | Iglesias | G06F 9/443 |
| | | | 715/200 |
| 2011/0055001 A1* | 3/2011 | Mattern | G06Q 30/02 |
| | | | 705/14.43 |
| 2013/0110643 A1* | 5/2013 | Goyal | G06Q 30/02 |
| | | | 705/14.68 |
| 2014/0229277 A1* | 8/2014 | Khambete | G06F 17/30699 |
| | | | 705/14.52 |

FOREIGN PATENT DOCUMENTS

| | | | | |
|---|---|---|---|---|
| WO | 01/11504 A2 | 2/2001 | | |
| WO | WO 01/11504 | * 2/2001 | | G06F 17/30 |
| WO | WO-0111504 A2 | * 2/2001 | | |

OTHER PUBLICATIONS

Thomaidou et al.: GrammAds and Ad Creative Generator for Online Advertising Campaigns, Jun. 1, 2011, pp. 1-12.*
Kae et al.: Categorization of Display Ads using Image and Landing Page Features, 2011, ACM, pp. 1-8. (Year: 2011).*
Thomaidou et al.: GrammAds and Ad Creative Generator for Online Advertising Campaigns, Jun. 1, 2011, pp. 1-12 (Year: 2011).*
IBM: System and Technology for automatically or interactively adjusting advertisement levels for web based data sources, Jun. 13, 2002. IP.Com No. IPCOM000013370D, pp. 1-5.
Princeton University: Guide to creating website—information architecture and content, 2008, Version 2.2. pp. 1-43.
Tomhanna: Introduction to Website Advertising, Jun. 2006, Internet Archives, Codex, WordPress.org, pp. 1-16.

* cited by examiner

SYSTEM AND METHOD FOR CLIENT-SIDE ADVERTISEMENT RETRIEVAL

CROSS-REFERENCE TO RELATED APPLICATIONS

This application is a continuation of co-pending U.S. patent application Ser. No. 12/120,250, filed May 14, 2008. The aforementioned related patent application is herein incorporated by reference in its entirety.

BACKGROUND

Field of the Invention

In many World Wide Web (WWW) server applications in which a client device requests information from a website, one or more advertisements are typically part of the served web page. The web page is also referred to as the content. Typically, when a client device requests a web page that includes an advertisement, the web page and the advertisement are provided from the web server to the client's browser so that the browser can render the page and the advertisement. However, as traffic volume increases, web sites that experience large traffic volume typically move their content to one or more remote servers, sometimes referred to as a content delivery network (CDN). When traffic is relocated to a content delivery network, the content delivery network will access the web server for a copy of the requested page that the content delivery network should be delivering to a client device. Therefore, if one or more advertisements are embedded in the source of the page that was fetched and retrieved by the content delivery network, the same advertisement or advertisements would be repeatedly delivered to all client devices.

An existing solution for coordinating the placement of an advertisement in a web page uses what are referred to as "I-frames." However, this solution still requires multiple calls to an advertisement management system for each advertisement and logging for each of the ads displayed.

Therefore, there is a need for a way of efficiently delivering web pages and advertisements when the web page and the advertisement are provided from different sources.

SUMMARY

Embodiments of the invention include a system that performs an operation for retrieving advertisements. The operation includes receiving a document comprising a request to retrieve a plurality of advertisement creatives. Here, the request specifies an advertisement management system and a single identification tag identifying a plurality of advertisement types to be inserted within the document, and the plurality of advertisement types include all advertisement types to appear within the document. The operation also includes, responsive to transmitting the request specified within the received document to the advertisement management system, receiving a single software object defining all of the plurality of advertisement creatives. The advertisement management system is configured to select the plurality of advertisement creatives based on the plurality of advertisement types identified by the single identification tag specified within the transmitted request. Additionally, the operation includes inserting each of the plurality of advertisement creatives into the document, prior to rendering the document. The operation further includes rendering the document together with the advertisement creatives.

Other embodiments are also provided. Other systems, methods, features, and advantages of the invention will be or become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE FIGURES

The invention can be better understood with reference to the following figures. The components within the figures are not necessarily to scale, emphasis instead being placed upon clearly illustrating the principles of the invention. Moreover, in the figures, like reference numerals designate corresponding parts throughout the different views.

DETAILED DESCRIPTION

Figure 1:
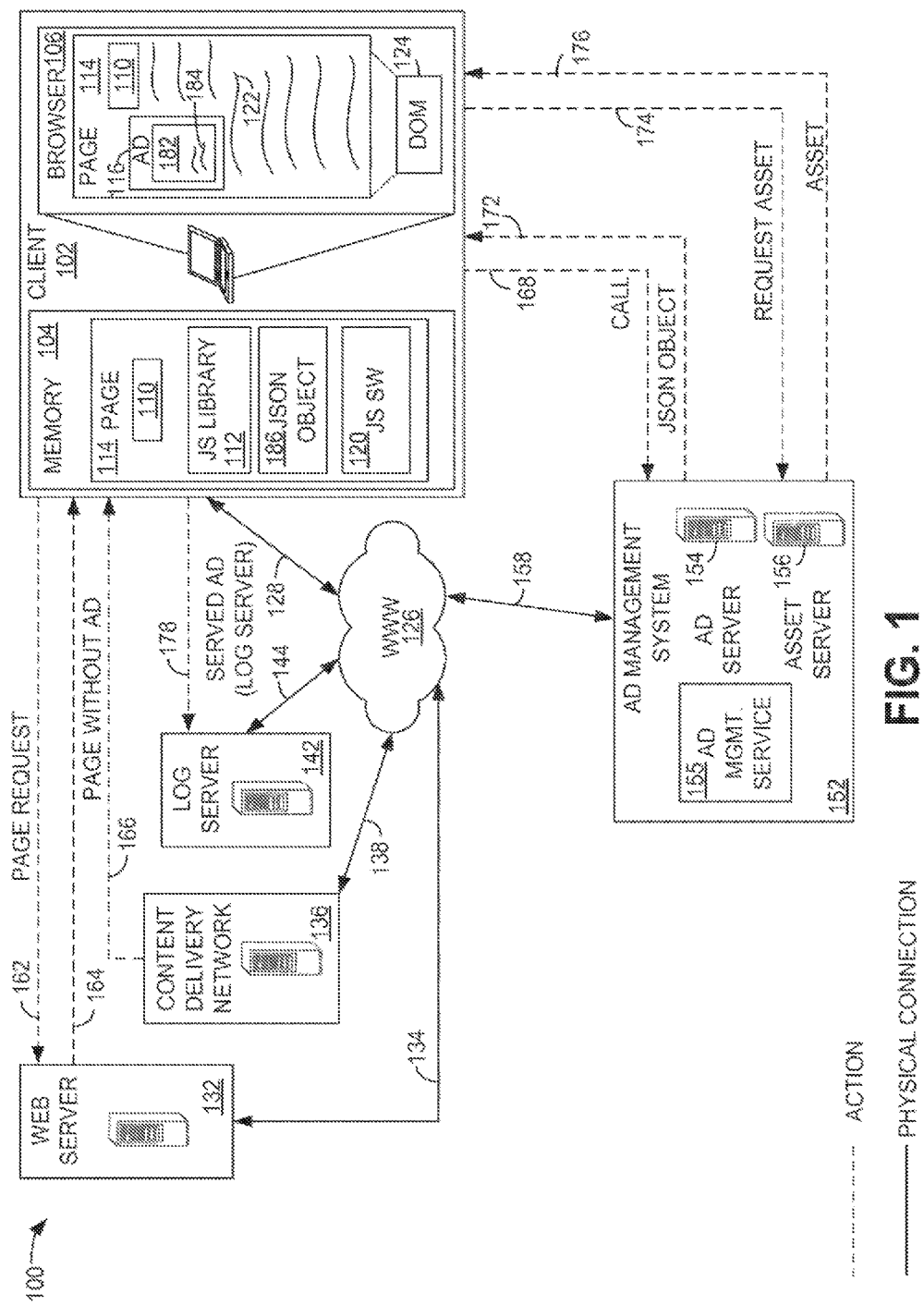
FIG. 1 is a block diagram illustrating an example of a system for client-side advertisement retrieval.

The system and method for client-side advertisement retrieval will be described in the context of providing web content and advertisement content to a client from two remote and separate sources via the World Wide Web (WWW), or any other wide area network or local area network. However, the system and method for client-side advertisement retrieval is applicable to delivering any content and any asset related to or desired to be presented with the content to any client device.

The system and method for client-side advertisement retrieval can be implemented in hardware, software, or a combination of hardware and software. When implemented in hardware, the system and method for client-side advertisement retrieval can be implemented using specialized hardware elements and logic. When the system and method for client-side advertisement retrieval is implemented in software, the software can be used to control the various components in a system and network associated with the program. The software can be stored in a memory and executed by a suitable instruction execution system (microprocessor). The hardware implementation of the system and method for client-side advertisement retrieval can include any or a combination of the following technologies, which are all well known in the art: discrete electronic components, a discrete logic circuit(s) having logic gates for implementing logic functions upon data signals, an application specific integrated circuit having appropriate logic gates, a programmable gate array(s) (PGA), a field programmable gate array (FPGA), etc.

The software for the system and method for client-side advertisement retrieval comprises an ordered listing of executable instructions for implementing logical functions, and can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: a portable computer diskette (magnetic), a random access memory (RAM), a read-only memory (ROM), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance, optical scanning of the paper or other medium, then compiled, interpreted or otherwise processed in a suitable manner if necessary, and then stored in a computer memory.

In the description to follow, the terms "advertisement," "advertisement type," "ad creative" and "creative asset" will be used. As used herein, an "advertisement" is a general term that represents the final product of an advertisement appearing on a webpage, or whatever media is being used. An "advertisement type" or "ad type" is an identifier known by the advertisement management system that specifies the category of the ad (for example, "banner" or "skyscraper"). An "advertisement creative" or "ad creative" is the code that is defined to request creative assets to show an advertisement on a page. The "ad creative" can be HTML, plain text, JavaScript or any other type of code or script that can be interpreted by a browser in a client device. An "ad creative" may also be referred to as "ad creative text" and "ad type creative." As an example, an ad creative could be an HTML <IMG> tag. A "creative asset" is the actual image file (JPG, GIF, PNG), Flash file, video file, and the like, that is referenced via the ad creative text to display the advertisement on the page.

FIG. 1 is a block diagram illustrating an example of a system for client-side advertisement retrieval 100. The system for client-side advertisement retrieval 100 includes a client 102 connected to a network 126 over connection 128. The client 102 is illustrated for simplicity as a personal computer. However, the client 102 can be any device that requests content from a web server. For example, the client 102 can be a portable digital assistant (PDA), a personal computer (PC), a portable communication device such as a cellular phone, or any other device that requests content from a server. In a non-limiting example, the network 126 can be a wide area network, such as the World Wide Web (WWW), a local area network (LAN), a wireless network, or any other network.

The system for client-side advertisement retrieval 100 also includes a web server 132 connected to the network 126 via connection 134, a content delivery network 136 connected to the network 126 over connection 138, a log server 142 connected to the network 126 over connection 144 and an advertisement (ad) management system 152 connected to the network 126 via connection 158.

In an example implementation, the web server 132 is a content server that experiences periodic heavy traffic. Because of the periodic heavy traffic, the responsibility for the delivery of certain content is transferred from the web server 132 to the content delivery network 136. However, when the web page content delivery function is transferred to or shared with the content delivery network 136, coordinating the assembly of the web page content and the advertisement becomes complicated. This is so because the content and the components to display an advertisement can be located on different servers. Therefore, in this example, the content delivery network 136 provides only the requested content (i.e., the web page) without the advertisement.

As will be described in greater detail below, in an embodiment, when the content delivery network 136 serves a web page, it serves the web page without an advertisement. However, in an embodiment, the web page includes an identification tag 110. The identification tag 110 can be, for example, a script tag, such as a JavaScript tag, that specifies to an advertisement management system 152 all of the ad types that appear on the page. The identification tag 110 allows the client 102 to initiate a single request for the creative text of the advertisement or advertisements that should accompany the served content. In an embodiment, the "identification tag" 110 can be a JavaScript tag that passes all of the ad types that appear on the page to the advertisement management system 152. In this manner, the advertisement management system 152 is informed as to the type or types of ad creative(s) it should return to the client.

The client 102 includes a memory 104 and a browser 106. The memory 104 provides storage for one or more a web pages, an exemplary one of which is illustrated at 114. The web page 114 includes an identification tag 110. As described above, the identification tag 110 allows the web page 108 to identify the type of advertisement or advertisements that are to be part of the web page 108.

The client 102 also includes a browser 106. The browser 106 renders the page 114, including an advertisement 116 according to a document object model 124. The document object model 124 defines the manner in which the page 114 is rendered. The page 114 also includes content 122, which can be, for example, text, images, or any other page content. As will be described more fully below, in an embodiment, the memory 104 also includes JavaScript software 120, a JavaScript Object Notation (JSON) object 186 and a JavaScript library 112, which defines methods to insert an ad creative into a document object model 124. The document object model 124 defines the web page 114. As will be more fully described below, the JavaScript software 120 makes calls to the JavaScript library 112 that interprets the JSON object 186 to insert an advertisement in the page 114 that is rendered by the browser 106.

The page 114 includes a single call to the ad management system 152 for the JSON object 186 that defines and includes the creative text. The page 114 also includes a request to a JavaScript library 112 and includes embedded JavaScript to insert an ad creative into the document object model 124.

The advertisement management system 152 includes an advertisement (ad) server 154 and an asset server 156. The ad server 154 receives a single request from the client 102. The request received from the client 102, initiated by the identification tag 110, allows the ad server 154 to select the appropriate ad creative, or ad creatives, and also allows the ad server 154 to create a JSON object 186, which is returned to the client 102. An ad creative 182 is provided to the browser 106 in the form of the JSON object 186. The browser 106 then inserts an ad creative 182 in the page 114 while rendering the page 114. After the ad creative 182 is inserted in the page 114, the ad creative 182 references a creative asset 184. The asset server 156 provides the creative asset 184 for inclusion in the advertisement 116. The asset server 156 need not be located in the ad management system 152. The asset server 156 may also be a third party. The dotted lines shown in FIG. 1 indicate the actions taken by the various elements, and will be described in further detail in FIG. 2. The ad management system 154 also returns advertisement logging information to the client 102, along with the ad creative 182 within the JSON object 186.

Figure 2A:
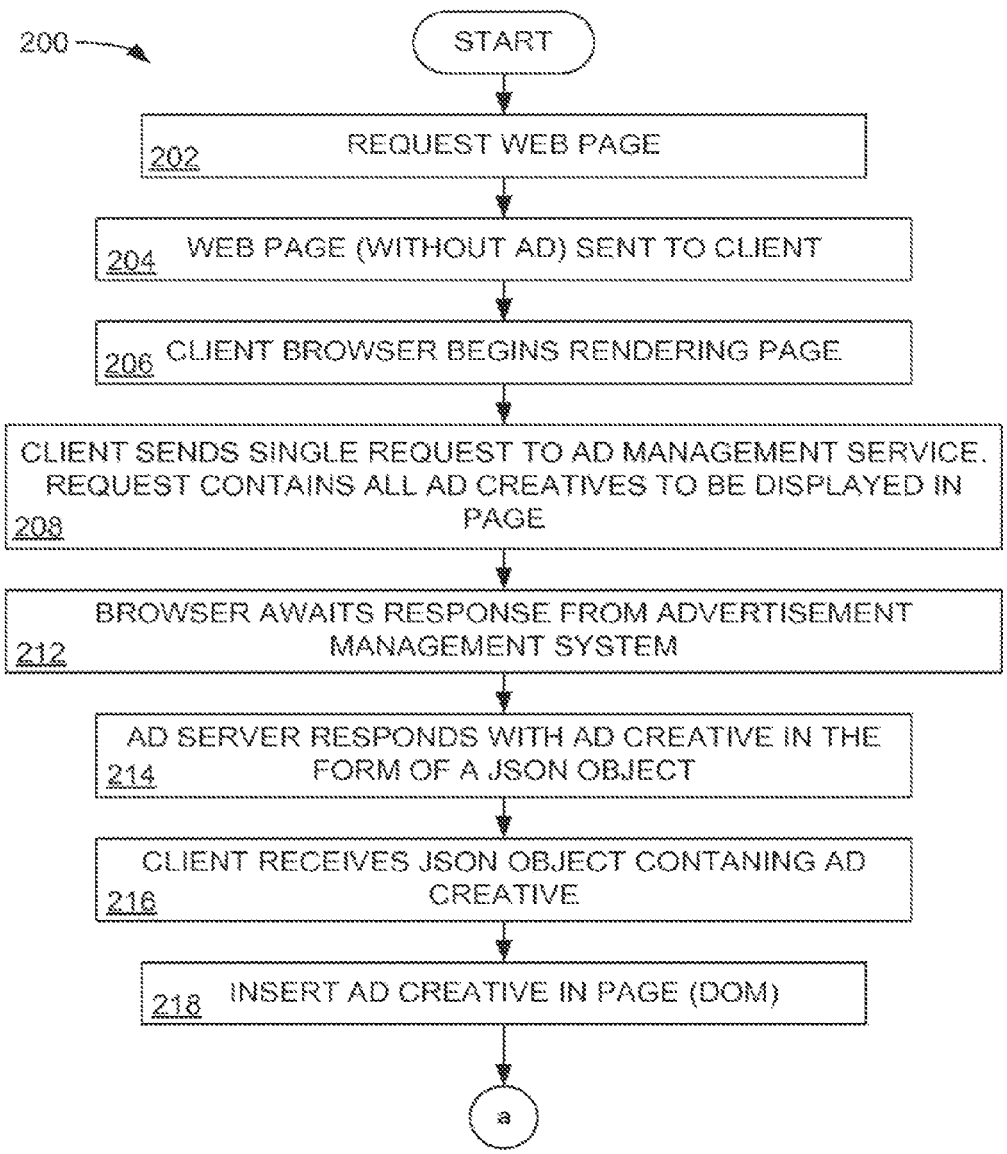
FIGS. 2A and 2B are a flowchart collectively illustrating the operation of an embodiment of a method for client-side advertisement retrieval.
Figure 2B:
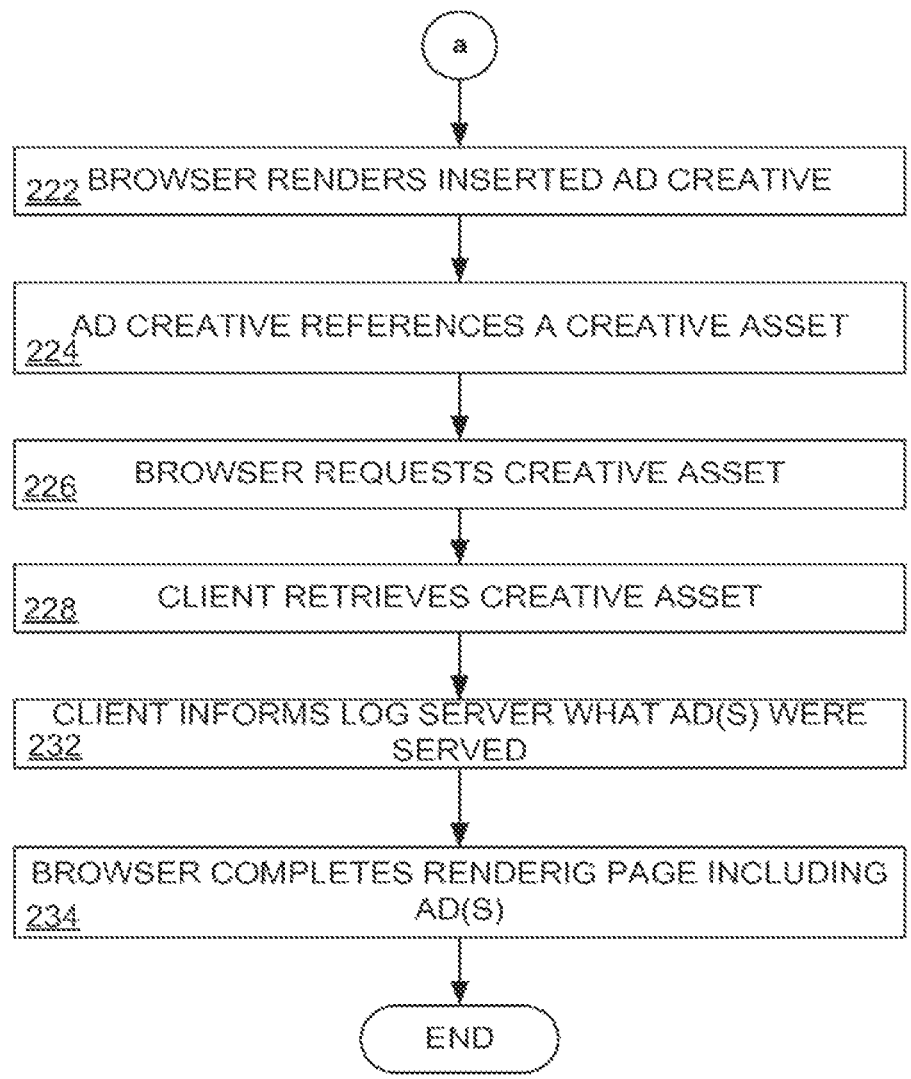

FIGS. 2A and 2B are a flowchart 200 collectively describing the operation of an exemplary embodiment of a method for client-side advertisement retrieval. In block 202 the client 102 requests a web page from the web server 132. In this example, the requested page has been transferred from the web server 132 to the content delivery network 136; however, this need not be the case. In the example described, in block 204, the content delivery network 136 delivers the requested web page without the advertisement to the client 102. This is illustrated using the dotted line 166 in FIG. 1. The page is illustrated at 114 within the client 102. In this example, the page 114 includes an identification tag 110. The identification tag 110 allows the client 102 to initiate a single request for the ad creative associated with an advertisement or advertisements that are associated with the page 114. As stated above, the ad creative(s) of the advertisement(s) associated with the page 114 are provided by the ad management system 152 and not the content delivery network 136.

The page 114 delivered to the client 102 includes a single call to the ad management system 152 for the ad creative within a JSON object 186. The page 114 also includes a request to retrieve the Javascript library 112. The page 114 also includes embedded Javascript to insert the ad creative 182 from the JSON object 186 into the document object model 124.

In block 206, the browser 106 begins rendering a page 114. In block 208, the client 102 sends a single call to the advertisement management system 152. The single call is a request for all ad creatives related to all advertisements on the page 114. The client 102 uses the information in the identification tag 110 to specify to the advertisement management system 152, and more particularly, the advertisement server 154, which advertisement or advertisements are to be rendered with the page 114. The request is illustrated using the dotted line 168. In block 212, the rendering engine associated with the browser 106 awaits a response from the ad management system 152.

In block 214 the advertisement server 154 responds to the client 102 with all ad creatives in the form of a JavaScript object notation (JSON) object 186, which is also returned to the client 102, as illustrated by the dotted line 172. Advertisement logging data is also returned to the client 102.

In block 216, the client 102 receives the JSON object 186 containing the ad creative 182. In block 218, the JavaScript software 120 reads and interprets the JSON object 186 and inserts the appropriate ad creative 182 into the document object model 124. This is accomplished by a Javascript call to the Javascript library 112 to insert the ad creative 182 in the document object model 124.

In block 222, the browser 106 renders the inserted ad creative 182. In block 224, the ad creative 182 references a creative asset 184.

In block 226, after the ad creative 182 is inserted in the page 114, the browser 106 requests the creative asset 184 associated with the ad creative 182 from the asset server 156. This is illustrated using the dotted line 174. The creative asset 184 can be text, an image, or any other asset that is part of the advertisement 116. In block 228, the client 102 retrieves the creative asset 184 from the asset server 156. This is illustrated using the dotted line 176.

In block 232, the client 102 sends a notification to the log server 142 informing the log server 142 which advertisement or advertisements were served from the advertisement management system 152. This is illustrated using the dotted line 178.

In block 234, the browser 106 completes the page rendering process and renders the page 114 including the creative asset 184. It should be mentioned that a page can contain multiple ad creatives 182 and creative assets 184 to be rendered.

While various embodiments of the invention have been described, it will be apparent to those of ordinary skill in the art that many more embodiments and implementations are possible that are within the scope of the invention.

What is claimed is:

1. A client system, comprising:
   a processor; and
   a memory containing a program that, when executed on the processor, performs an operation, comprising:
   receiving, over a data communication network, an electronic document comprising a request to retrieve a plurality of advertisement creatives, wherein the request specifies an advertisement management system and a single identification tag identifying a plurality of advertisement types to be inserted within the electronic document, wherein the plurality of advertisement types comprises all advertisement types to appear within the electronic document, and wherein each of the plurality of advertisement creatives comprises computer program code configured to request a respective advertisement of a type selected from one of the plurality of advertisement types;
   responsive to transmitting the request specified within the received electronic document to the advertisement management system, receiving, over the data communication network from the advertisement management system, a single software object, wherein the advertisement management system is configured to select the plurality of advertisement creatives based on the plurality of advertisement types identified by the single identification tag specified within the transmitted request, and wherein the single software object comprises a JavaScript object notation (JSON) object that defines all of the plurality of advertisement creatives and identifies how the advertisement creatives will be displayed by the browser:
   extracting, without requiring user interaction, all of the plurality of advertisement creatives from the single software object by referencing a library configured to interpret the single software object;
   inserting, without requiring user interaction, each of the plurality of advertisement creatives into the electronic document, prior to rendering the electronic document; and
   rendering the electronic document together with the plurality of advertisement creatives.

2. The system of claim 1, wherein the electronic document comprises a web page that is received from a web server, and wherein the web server is distinct from the advertisement management system.

3. The system of claim 1, the operation further comprising: notifying a log server of which advertisement assets were rendered.

4. A method, comprising:
   receiving, over a data communication network, an electronic document in a browser of a client system, the electronic document comprising a request to retrieve a plurality of advertisement creatives, wherein the request specifies an advertisement management system and a single identification tag identifying a plurality of advertisement types to be inserted within the electronic document, wherein the plurality of advertisement types comprises all advertisement types to appear within the electronic document, and wherein each of the plurality of advertisement creatives comprises computer program code configured to request a respective advertisement of a type selected from one of the plurality of advertisement types;

responsive to transmitting the request specified within the received electronic document to the advertisement management system, receiving, over the data communication network from the advertisement management system, a single software object, wherein the advertisement management system is configured to select the plurality of advertisement creatives based on the plurality of advertisement types identified by the single identification tag specified within the transmitted request, and wherein the single software object comprises a JavaScript object notation (JSON) object that defines all of the plurality of advertisement creatives and identifies how the advertisement creatives will be displayed by the browser;

extracting, in the client system without requiring user interaction, all of the plurality of advertisement creatives from the single software object by referencing a library configured to interpret the single software object;

inserting, in the client system without requiring user interaction, each of the plurality of advertisement creatives into the electronic document, prior to rendering the electronic document; and rendering the electronic document together with the plurality of advertisement creatives.

5. The method of claim 4, wherein the electronic document comprises a web page that is received from a web server, and wherein the web server is distinct from the advertisement management system.

6. The method of claim 4, further comprising:
notifying a log server of which advertising assets were rendered.

7. A non-transitory computer-readable medium containing a program that, when executed, performs an operation, comprising:
receiving, over a data communication network, in a browser of a client system, an electronic document comprising a request to retrieve a plurality of advertisement creatives, wherein the request specifies an advertisement management system and a single identification tag identifying a plurality of advertisement types to be inserted within the electronic document, wherein the plurality of advertisement types comprises all advertisement types to appear within the electronic document, and wherein each of the plurality of advertisement creatives comprises computer program code configured to request a respective advertisement of a type selected from one of the plurality of advertisement types;

responsive to transmitting the request specified within the received electronic document to the advertisement management system, receiving, over the data communication network from the advertisement management system, a single software object, wherein the advertisement management system is configured to select the plurality of advertisement creatives based on the plurality of advertisement types identified by the single identification tag specified within the transmitted request; wherein the single software object comprises a JavaScript object notation (JSON) object that defines all of the plurality of advertisement creatives and identifies how the advertisement creatives will be displayed by the browser;

extracting, without requiring user interaction, all of the plurality of advertisement creatives from the single software object by referencing a library configured to interpret the single software object;

inserting, by the client system and without requiring user interaction, each of the plurality of advertisement creatives into the electronic document, prior to rendering the electronic document; and rendering the electronic document together with the plurality of advertising creatives.

8. The non-transitory computer-readable medium of claim 7, wherein the electronic document is received from a web server, and wherein the web server is distinct from the advertisement management system.

9. The non-transitory computer-readable medium of claim 7, the operation further comprising:
notifying a log server of which advertisement assets were rendered.

10. The system of claim 1, wherein the electronic document further comprises a second request to retrieve the library configured to interpret the single software object, and the operation further comprises sending the second request to the library to interpret the single software object.

11. The non-transitory computer-readable medium of claim 7, wherein the electronic document further comprises a second request to retrieve the library configured to interpret the single software object, and the operation further comprises sending the second request to the library to interpret the single software object by separately extracting each of the plurality of advertisement creatives from the received single software object.

* * * * *

UNITED STATES PATENT AND TRADEMARK OFFICE
CERTIFICATE OF CORRECTION

PATENT NO. : 9,953,348 B2  
APPLICATION NO. : 14/091020  
DATED : April 24, 2018  
INVENTOR(S) : Whelan Page 1 of 1

It is certified that error appears in the above-identified patent and that said Letters Patent is hereby corrected as shown below:

On the Title Page

In Column 1, below "US 2018/0047066 A9 Feb. 15, 2018" insert item (60):
-- Related U.S. Application Data
Continuation of application no. 12/120,250, filed on May 14, 2008 --.

In the Claims

In Column 6, Line 44, in Claim 1, delete "browser:" and insert -- browser; --, therefor.

Signed and Sealed this
Thirty-first Day of July, 2018

Andrei Iancu
*Director of the United States Patent and Trademark Office*